(12) United States Patent
Yoshioka et al.

(10) Patent No.: US 12,537,654 B2
(45) Date of Patent: Jan. 27, 2026

(54) TERMINAL, RADIO COMMUNICATION METHOD, AND BASE STATION

(71) Applicant: NTT DOCOMO, INC., Tokyo (JP)

(72) Inventors: Shohei Yoshioka, Tokyo (JP); Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 325 days.

(21) Appl. No.: 18/268,492

(22) PCT Filed: Dec. 21, 2020

(86) PCT No.: PCT/JP2020/047766
§ 371 (c)(1),
(2) Date: Jun. 20, 2023

(87) PCT Pub. No.: WO2022/137304
PCT Pub. Date: Jun. 30, 2022

(65) Prior Publication Data
US 2024/0313927 A1    Sep. 19, 2024

(51) Int. Cl.
*H04L 5/00* (2006.01)
*H04B 7/06* (2006.01)

(52) U.S. Cl.
CPC ......... *H04L 5/0055* (2013.01); *H04B 7/0626* (2013.01); *H04L 5/0094* (2013.01)

(58) Field of Classification Search
CPC ... H04L 5/0055; H04L 5/0094; H04L 5/0057; H04B 7/0626; H04W 28/04; H04W 72/12
See application file for complete search history.

(56) References Cited

U.S. PATENT DOCUMENTS

| | | | |
|---|---|---|---|
| 2021/0243782 A1* | 8/2021 | Miao ..................... | H04L 5/0091 |
| 2022/0095317 A1* | 3/2022 | Papasakellariou .... | H04L 1/1671 |
| 2022/0360950 A1* | 11/2022 | Li ........................ | H04L 5/0051 |
| 2023/0163896 A1* | 5/2023 | Lin ...................... | H04L 1/1858 |
| | | | 370/312 |
| 2023/0180244 A1* | 6/2023 | Kou ..................... | H04L 1/1854 |
| | | | 370/312 |
| 2023/0231662 A1* | 7/2023 | Gou ..................... | H04L 1/1896 |
| | | | 370/329 |

OTHER PUBLICATIONS

International Search Report issued in PCT/JP2020/047766 on Jun. 22, 2021 (1 page).

(Continued)

*Primary Examiner* — Steven Hieu D Nguyen
(74) *Attorney, Agent, or Firm* — Osha Bergman Watanabe & Burton LLP

(57) ABSTRACT

A terminal according to one aspect of the present disclosure includes a control section that, when a physical uplink control channel (PUCCH) for transmission of hybrid automatic repeat reQuest acknowledgement (HARQ-ACK) information for a multicast physical downlink shared channel (PDSCH) overlaps with an uplink channel in a time domain, determines at least one channel of the PUCCH and the uplink channel, and a transmitting section that transmits the channel. According to one aspect of the present disclosure, it is possible to appropriately performs processing of the HARQ-ACK for multicast downlink data.

5 Claims, 9 Drawing Sheets

(56) References Cited

OTHER PUBLICATIONS

Written Opinion of the International Searching Authority issued in PCT/JP2020/047766 on Jun. 22, 2021 (3 pages).
CMCC; "Discussion on reliability improvement"; 3GPP TSG RAN WG1 #103-e, R1-2008035; e-Meeting; Oct. 26-Nov. 13, 2020 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Japanese Patent Application No. 2022-570789, mailed on Dec. 3, 2024 (6 pages).
ZTE; "Mechanisms to Improve Reliability for RRC_Connected UEs"; 3GPP TSG RAN WG1 Meeting #103-e, R1-2008827; e-Meeting; Oct. 26 Nov. 13, 2020 (5 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement or the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), it is assumed that a plurality of user terminals (User Equipment (UEs)) perform communication under ultra-high-density and high-traffic environments.

In NR, it is assumed that the plurality of UEs perform reception of downlink data using multicast under such environments.

However, for NR specifications thus far, transmission of a hybrid automatic repeat reQuest acknowledgement (HARQ-ACK) for multicast downlink data performed by the UE has not been fully studied. Unless processing of HARQ-ACK is appropriately performed, system performance degradation, such as throughput reduction, may occur.

Thus, an object of the present disclosure is to provide a terminal, a radio communication method, and a base station that appropriately performs processing of HARQ-ACK for multicast downlink data.

Solution to Problem

A terminal according to one aspect of the present disclosure includes a control section that, when a physical uplink control channel (PUCCH) for transmission of hybrid automatic repeat reQuest acknowledgement (HARQ-ACK) information for a multicast physical downlink shared channel (PDSCH) overlaps with an uplink channel in a time domain, determines at least one channel of the PUCCH and the uplink channel, and a transmitting section that transmits the channel.

Advantageous Effects of Invention

According to one aspect of the present disclosure, it is possible to appropriately performs processing of HARQ-ACK for multicast downlink data.

DESCRIPTION OF EMBODIMENTS

PUCCH Format

Figure 1:
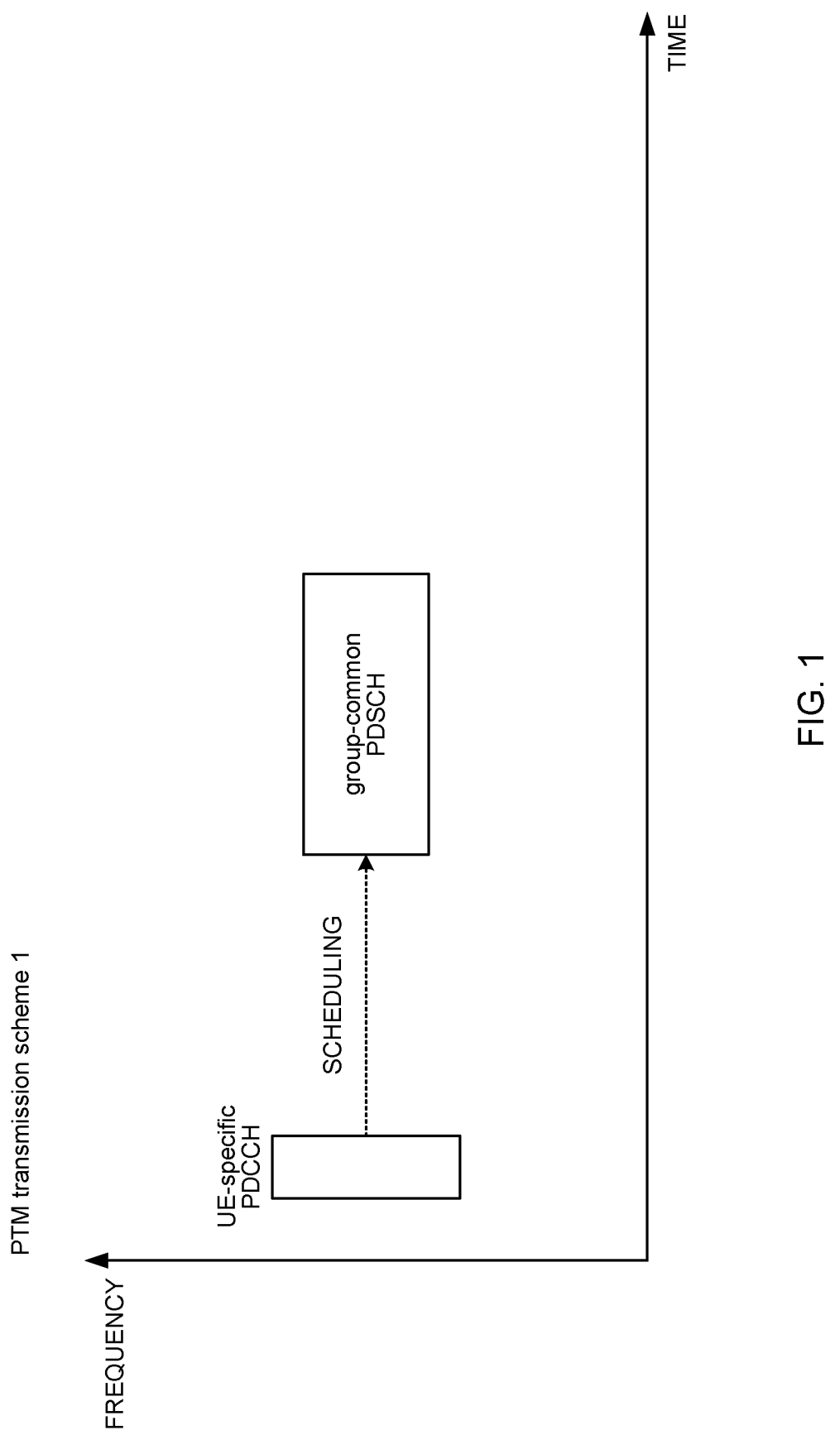
FIG. 1 is a diagram to show an example of PTM transmission scheme 1.

For future radio communication systems (for example, Rel. 15 (or later versions), 5G, NR, or the like), a configuration (also referred to as a format, a PUCCH format (PF), or the like) for an uplink control channel (for example, a PUCCH) used for transmitting uplink control information (UCI) is under study. For example, for Rel-15 NR, support for five kinds of PFs, PF 0 to PF 4, is under study. Note that the names of the PFs described below are just examples, and different names may be used.

For example, PF 0 and PF 1 are PFs used for transmitting UCI having 2 bits or less (up to 2 bits). For example, the UCI may be at least one of transmission confirmation information (also referred to as a Hybrid Automatic Repeat reQuest-Acknowledgement (HARQ-ACK), an acknowledgement (ACK), a negative-acknowledgement (NACK), or the like) and a scheduling request (SR). PF 0 can be allocated to one or two symbols, and is thus also referred to as a short PUCCH, a sequence-based short PUCCH, or the like. On the other hand, PF1 can be allocated to 4 to 14 symbols, and is thus also referred to as a long PUCCH or the like. PF 0 may transmit a sequence obtained by a cyclic shift of a base sequence by using a cyclic shift based on at least one of an initial cyclic shift (CS) index, a UCI value, a slot number, and a symbol number. In PF 1, by using block-wise spread in a time domain using at least one of a CS and a time domain (TD)-orthogonal cover code (OCC), a plurality of user terminals may be code division multiplexed (CDMed) in an identical physical resource block (PRB).

PF 2 to PF 4 are PFs used for transmitting UCI (for example, channel state information (CSI) or at least one of CSI, an HARQ-ACK, and an SR) having more than 2 bits. PF 2 can be allocated to 1 or 2 symbols, and is thus also referred to as a short PUCCH or the like. On the other hand, PF 3 and PF 4 can be allocated to 4 to 14 symbols, and are thus also referred to as a long PUCCH or the like. In PF 4, a plurality of user terminals may be CDMed by using block-wise spread before a DFT (with a frequency domain (FD)-OCC).

Intra-slot frequency hopping may be applied to PF 1, PF 3, and PF 4. Let a length of the PUCCH be $N_{symb}$, the length before frequency hopping (first hop) may be floor ($N_{symb}/2$), and the length after frequency hopping (second hop) may be ceil ($N_{symb}/2$).

Waveform of PF 0, PF 1, and PF 2 may be Cyclic Prefix (CP)-Orthogonal Frequency Division Multiplexing (OFDM). Waveform of PF 3 and PF 4 may be Discrete Fourier Transform (DFT)-spread (s)-OFDM.

Allocation of a resource (for example, a PUCCH resource) used for transmission of the uplink control channel is performed by using higher layer signaling and/or downlink control information (DCI). Here, it is only necessary that the higher layer signaling is, for example, at least one of RRC (Radio Resource Control) signaling, system information (for example, at least one of RMSI (Remaining Minimum System Information), OSI (Other System Information), an MIB (Master Information Block), and an SIB (System Information Block)), and broadcast information (PBCH (Physical Broadcast Channel)).

In NR, the number of symbols allocated to the PUCCH (which may be referred to as PUCCH allocation symbols, PUCCH symbols, or the like) can be determined in any one of a slot-specific manner, a cell-specific manner, and a user terminal-specific manner or combinations of these. It is expected that the more the number of PUCCH symbols increases, the more a communication range (coverage) extends, and thus, for example, operation in which the more a user terminal is distant from a base station (for example, eNB or gNB), the more the number of symbols increases is assumed.

HARQ-ACK Feedback

For NR, mechanisms for a user terminal (UE (User Equipment)) that feeds back (also referred to as report, transmission, or the like) transmission confirmation information (also referred to as a Hybrid Automatic Repeat reQuest-ACKnowledge (HARQ-ACK), ACKnowledge/Non-ACK (ACK/NACK), HARQ-ACK information, A/N, or the like) for a downlink shared channel (also referred to as a Physical Downlink Shared Channel (PDSCH) or the like) are under study.

For example, in NR Rel. 15, a value of a given field in DCI (for example, DCI format 1_0 or DCI format 1_1) used for scheduling a PDSCH indicates a feedback timing of an HARQ-ACK for the PDSCH. When the UE transmits, in slot #n+k, an HARQ-ACK for the PDSCH received in slot #n, the value of the given field may be mapped to a k value. The given field is referred to as, for example, a PDSCH-HARQ feedback timing indicator (PDSCH-to-HARQ_feedback timing indicator) field or the like.

In NR Rel. 15, based on a value of a given field in DCI (for example, DCI format 1_0 or DCI format 1_1) used for scheduling a PDSCH, a PUCCH resource to be used for feedback of an HARQ-ACK for the PDSCH is determined. The given field may be referred to as, for example, a PUCCH resource indicator (PRI) field, an ACK/NACK resource indicator (ARI) field, or the like. The value of the given field may be referred to as a PRI, an ARI, or the like.

The PUCCH resource mapped to each value of the given field may be configured for the UE beforehand by using a higher layer parameter (for example, ResourceList in PUCCH-ResourceSet). The PUCCH resource may be configured for the UE for each set (PUCCH resource set) including one or more PUCCH resources.

For NR Rel. 15, the UE that does not expect that more than one uplink control channel (Physical Uplink Control Channel (PUCCH)) having an HARQ-ACK is transmitted in a single slot is under study.

Specifically, in NR Rel. 15, one or more HARQ-ACKs in a single slot may be mapped to a single HARQ-ACK codebook, and the HARQ-ACK codebook may be transmitted on a PUCCH resource indicated by the most recent (last) DCI.

Here, the HARQ-ACK codebook may include a bit for the HARQ-ACK in a unit of at least one of a time domain (for example, a slot), a frequency domain (for example, a component carrier (CC)), a spatial domain (for example, a layer), a transport block (TB), and a group of code blocks (code block group (CBG)) constituting the TB. Note that the CC is also referred to as a cell, a serving cell, a carrier, or the like. The bit is also referred to as an HARQ-ACK bit, HARQ-ACK information, an HARQ-ACK information bit, or the like.

The HARQ-ACK codebook is also referred to as a PDSCH-HARQ-ACK codebook (pdsch-HARQ-ACK-Codebook), a codebook, a HARQ codebook, an HARQ-ACK size, or the like.

The number of bits (size) or the like included in the HARQ-ACK codebook may be determined semi-statically or dynamically. The semi-static HARQ-ACK codebook is also referred to as a type-1 HARQ-ACK codebook, a semi-static codebook, or the like. The dynamic HARQ-ACK codebook is also referred to as a type-2 HARQ-ACK codebook, a dynamic codebook, or the like.

Which of the type-1 HARQ-ACK codebook or the type-2 HARQ-ACK codebook is used may be configured for the UE by using a higher layer parameter (for example, pdsch-HARQ-ACK-Codebook).

In a case of the type-1 HARQ-ACK codebook, the UE may feed back, in a given range (for example, a range configured based on the higher layer parameter), an HARQ-ACK bit corresponding to the given range regardless of whether a PDSCH is scheduled.

The given range may be determined based on at least one of a given period (for example, a set of a given number of occasions for candidate PDSCH reception or a given number of monitoring occasions for a PDCCH), the number of CCs to be configured or activated for the UE, the number of TBs (the number of layers or a rank), the number of CBGs per TB, and whether or not spatial bundling is applied. The given range is also referred to as an HARQ-ACK bundling window, an HARQ-ACK feedback window, a bundling window, a feedback window, or the like.

In the type-1 HARQ-ACK codebook, the UE feeds back, if in the given range, a NACK bit even when a PDSCH for the UE is not scheduled. Thus, when the type-1 HARQ-ACK codebook is used, it is also assumed that the number of HARQ-ACK bits to be fed back increases.

On the other hand, in a case of the type-2 HARQ-ACK codebook, in the above-described given range, the UE may feed back an HARQ-ACK bit for a scheduled PDSCH.

Specifically, the UE may determine the number of bits of the type-2 HARQ-ACK codebook based on a given field (for example, a DL assignment index (Downlink Assignment Indicator (Index) (DAI)) field) in DCI. The DAI field may be split into a counter DAI (cDAI) and a total DAI (tDAI).

The counter DAI may indicate a counter value of downlink transmission (a PDSCH, data, or a TB) to be scheduled in a given period. For example, the counter DAI in DCI scheduling data in the given period may indicate a number counted in the given period, the number being counted first in a frequency domain (for example, order of CC indices) and counted subsequently in a time domain (order of time indices).

The total DAI may indicate a total value (total number) of data to be scheduled in the given period. For example, the total DAI in DCI scheduling data in a given time unit (for example, a PDCCH monitoring occasion) in the given period may indicate a total number of data scheduled in the given period until the given time unit (also referred to as a point, timing, or the like).

When code block group (CBG)-based transmission (CBG-based HARQ-ACK codebook determination) is not configured for the UE by a higher layer parameter (PDSCH code block group transmission information element, PDSCH-CodeBlockGroupTransmission), the UE assumes transport block (TB)-based transmission (TB-based HARQ-ACK codebook determination). In other words, the UE generates an HARQ-ACK information bit for each TB.

When the higher layer parameter of the PDSCH code block group transmission information element is provided for a serving cell (Component Carrier (CC)), the UE receives a PDSCH including a plurality of CBGs in one TB. The PDSCH code block group transmission information element includes a maximum number of CBGs in one TB (maxCodeBlockGroupsPerTransportBlock). For TB reception in the serving cell, the UE generates respective HARQ-ACK information bits for the plurality of CBGs, and generates an HARQ-ACK codebook including HARQ-ACK information bits with the maximum number of CBGs.

The UE may transmit one or more HARQ-ACK bits determined (generated) based on the above type-1 or type-2 HARQ-ACK codebook by using at least one of an uplink control channel (Physical Uplink Control Channel (PUCCH)) and an uplink shared channel (Physical Uplink Shared Channel (PUSCH)).

In Rel. 15, DCI format 0_1 (UL grant) used for scheduling the PUSCH includes a field of a 1 or 2-bit first (1st) downlink assignment index (first DAI) and a field of a 0 or 2-bit second (2nd) downlink assignment index (second DAI).

The first DAI for the semi-static HARQ-ACK codebook (type-1 HARQ-ACK codebook) is 1 bit. The first DAI for the dynamic HARQ-ACK codebook (type-2 HARQ-ACK codebook) is 2 bits.

The second DAI for the dynamic HARQ-ACK codebook having two HARQ-ACK subcodebooks is 2 bits. In a case other than that case, the second DAI is 0 bit.

When the UE for which the semi-static HARQ-ACK codebook is configured multiplexes HARQ-ACK information in PUSCH transmission scheduled by DCI format 0_1, the UE may, if a value of a DAI field (first DAI) $V_{T\text{-}DAI,m_{UL}}$ in DCI format 0_1 is 1, generate an HARQ-ACK codebook by using the first DAI instead of the total DAI.

When the UE for which the dynamic HARQ-ACK codebook is configured multiplexes HARQ-ACK information in PUSCH transmission scheduled by DCI format 0_1, the UE may generate, based on a value of a DAI field (first DAI) $V_{T\text{-}DAI,m_{UL}}$ in DCI format 0_1, an HARQ-ACK codebook by using the first DAI instead of the total DAI.

When a first HARQ-ACK subcodebook and a second HARQ-ACK subcodebook are used, DCI format 0_1 includes a first DAI corresponding to the first HARQ-ACK subcodebook and a second DAI corresponding to the second HARQ-ACK subcodebook.

When the semi-static HARQ-ACK codebook is configured, the UE receives a 1-bit UL DAI (first DAI) in a UL grant for scheduling of a PUSCH. When a value of the UL DAI is 1, and a PUCCH for HARQ-ACK reporting and a PUSCH collide with each other in at least 1 symbol, the UE piggybacks an HARQ-ACK on the PUSCH (UCI on PUSCH, HARQ-ACK on PUSCH). When the value of the UL DAI is 1, the base station may assume that the HARQ-ACK is piggybacked on the PUSCH regardless of the PUCCH and the PUSCH collide with each other, and may perform rate matching for a UL-SCH delivered on the PUSCH. Even when the UE fails to detect a PDCCH corresponding to the HARQ-ACK, and the PUCCH does not collide with the PUSCH, the UE may transmit, for the rate matching, a NACK on the PUSCH.

When the dynamic HARQ-ACK codebook is configured, the UE receives a 2-bit UL DAI (first DAI) in a UL grant for scheduling of a PUSCH. This UL DAI indicates the number of HARQ-ACKs (total DAI) piggybacked on the PUSCH. When a PUCCH for HARQ-ACK reporting and a PUSCH collide with each other in at least 1 symbol, the UE piggybacks, on the PUSCH, HARQ-ACKs the number of which is indicated by the UL DAI. The base station may assume that the HARQ-ACKs equivalent to the number indicated by the UL DAI are piggybacked on the PUSCH regardless of the PUCCH and the PUSCH collide with each other, and may perform rate matching for a UL-SCH delivered on the PUSCH. Even when the UE fails to detect a PDCCH corresponding to the HARQ-ACK, and the PUCCH does not collide with the PUSCH, the UE may transmit on the PUSCH, for the rate matching, NACKs the number of which is indicated by the UL DAI.

When the CBG-based HARQ-ACK codebook is configured, the UE receives, in a UL grant for scheduling of a PUSCH, a 2-bit UL DAI (first DAI) and a 2-bit UL DAI (second DAI). The first DAI indicates the number of first HARQ-ACK subcodebooks piggybacked on the PUSCH. The second DAI indicates the number of second HARQ-ACK subcodebooks piggybacked on the PUSCH. When a PUCCH for HARQ-ACK reporting and a PUSCH collide with each other in at least 1 symbol, the UE piggybacks, on the PUSCH, first HARQ-ACK subcodebooks the number of which is indicated by the first DAI and second HARQ-ACK subcodebooks the number of which is indicated by the second DAI. The base station may assume that HARQ-ACKs the number of which is indicated by the first DAI and the second DAI are piggybacked on the PUSCH regardless of the PUCCH and the PUSCH collide with each other, and may perform rate matching for a UL-SCH delivered on the PUSCH. Even when the UE fails to detect a PDCCH corresponding to the HARQ-ACK, and the PUCCH does not collide with the PUSCH, the UE may transmit, for the rate matching, NACKs the number of which is indicated by the first DAI and the second DAI on the PUSCH.

Thus, the UE determines, based on a UL DAI in a UL grant for scheduling of a PUSCH, whether to piggyback an HARQ-ACK on the PUSCH.

NR Multicast/Broadcast

In Rel-16 (or previous versions) NR, the basics of transmission of at least one of a signal and a channel (hereinafter expressed as a signal/channel) from a NW to a UE is unicast transmission. In this case, it is assumed that identical downlink (DL) data signals/channels (for example, downlink shared channels (PDSCHs)) transmitted from the NW to a plurality of UEs are received by the respective UEs using a plurality of reception occasions corresponding to a plurality of beams (or panels) of the NW.

A case where a plurality of UEs simultaneously receive identical signals/channels under ultra-high-density and high-traffic circumstances, such as environments (for example, a stadium or the like) in which a number of UEs are geographically concentrated, is also assumed. In such a case, it is assumed that a case that a plurality of UEs are present in an identical area, and in order for each UE to receive an identical signal/channel, each UE performs reception of the signal/channel by using unicast can secure reliability of communication, but reduces resource use efficiency.

A group scheduling mechanism for a multicast/broadcast service (MBS) received by the plurality of UEs is under study.

For example, scheduling of a multicast PDSCH using single or multiple DCIs is under study. In this case, a DCI size (payload size, overhead) may become large.

In Point-to-Point (PTP) transmission (delivery method), a RAN node (for example, a base station) transmits, to an individual UE, a separate copy of an MBS data packet via radio. In Point-to-Multipoint (PTM) transmission (delivery method), the RAN node (for example, the base station) transmits, to a set of UEs, a single copy of the MBS data packet via radio. The PTP transmission may be referred to as unicast transmission.

It is under study that the PTP transmission uses a UE-specific PDCCH for a plurality of RRC connected UEs (RRC_CONNECTED UEs) in order to schedule a UE-specific PDSCH and that the UE-specific PDCCH has a cyclic redundancy check (CRC) scrambled by a UE-specific radio network temporary identifier (RNTI) (for example, C-RNTI), and the UE-specific PDSCH is scrambled by using the same UE-specific RNTI.

It is under study that PTM transmission scheme 1 uses a group-common PDCCH for a plurality of RRC connected UEs in the same MBS group in order to schedule a group-common PDSCH and that the group-common PDCCH has a CRC scrambled by a group-common RNTI, and the group-common PDSCH is scrambled by using the same group-common RNTI (FIG. 1).

Figure 2:
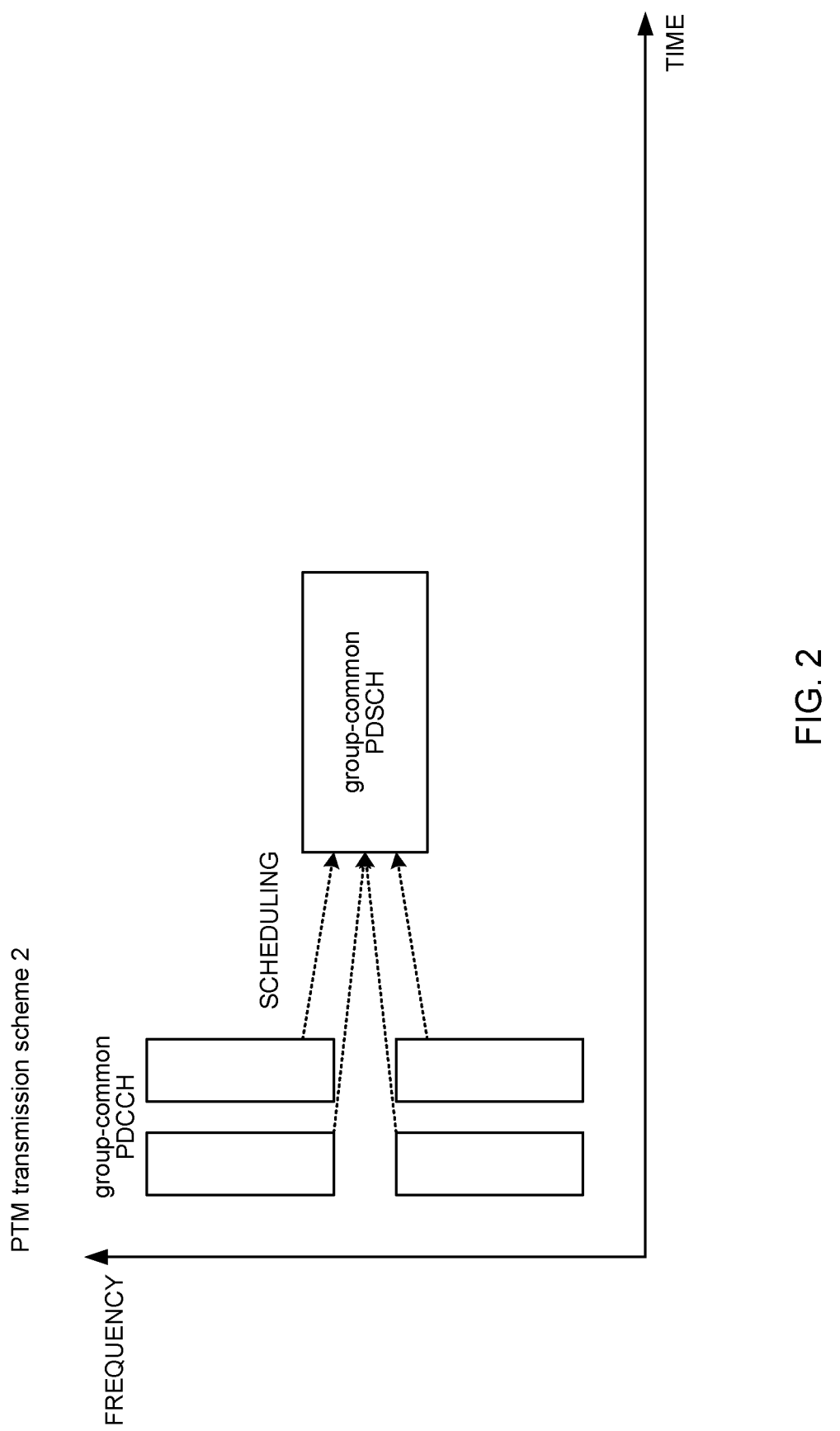
FIG. 2 is a diagram to show an example of PTM transmission scheme 2.

It is under study that PTM transmission scheme 2 uses a UE-specific PDCCH for a plurality of RRC connected UEs in the same MBS group in order to schedule a group-common PDSCH and that the UE-specific PDCCH has a CRC scrambled by a UE-specific RNTI (for example, C-RNTI), and the group-common PDSCH is scrambled by using the group-common RNTI (FIG. 2).

Here, the UE-specific PDCCH/PDSCH can be identified by a target UE, but another UE in the same MBS group fails to identify the UE-specific PDCCH/PDSCH. The group-common PDCCH/PDSCH are transmitted in the same time/frequency resource, and can be identified by all UEs in the same MBS group.

HARQ feedback for improvement in reliability of the MBS is under study.

For the RRC connected UEs to receive multicast, at least PTM transmission scheme 1 may support at least one of feedback method 1 and feedback method 2 below.

[Feedback Method 1] HARQ-ACK Feedback Based on ACK/NACK for Multicast (ACK/NACK Based HARQ-ACK Feedback, ACK/NACK Based PUCCH, ACK/NACK Transmission, ACK/NACK Feedback, HARQ-ACK Information Including ACK or NACK)

A UE that successfully decodes the PDSCH transmits an ACK. A UE that fails to decode the PDSCH transmits a NACK.

[Feedback Method 2] HARQ-ACK Feedback Based Only on NACK for Multicast (NACK-only Based HARQ-ACK Feedback, NACK-only Based PUCCH, NACK-only Transmission, NACK-only Feedback, HARQ-ACK Information Including Only NACK)

A UE that successfully decodes the PDSCH does not transmit an ACK. A UE that fails to decode the PDSCH transmits a NACK.

However, UE operation in a case where a PUCCH including an HARQ-ACK corresponding to the multicast PDSCH collides with another UL channel in a time domain is indefinite. For example, issue 1 to issue 3 below can occur.

[Issue 1]

In a certain UE in a case where for the PUCCH including the HARQ-ACK corresponding to the multicast PDSCH, a PUCCH resource used for transmission is shared (common) among a plurality of UEs, UE operation in a case (FIG. 3) where a PUSCH colliding with the PUCCH in the time domain is present is indefinite.

In this case, whether the UE uses the shared (common) PUCCH resource or uses the PUSCH is indefinite. This UE operation has influence on base station operation.

[Issue 2]

In a certain UE in a case where for the PUCCH including the HARQ-ACK corresponding to the multicast PDSCH, NACK-only feedback is configured/indicated, UE operation in a case (FIG. 4) where a UL channel colliding with a resource of the PUCCH in the time domain is present is indefinite.

In this case, whether the UE transmits the HARQ-ACK is indefinite. The base station does not recognize whether a NACK is transmitted. In this case, a value of the UL DAI is indefinite.

[Issue 3]

UE operation for collision between an HARQ-ACK corresponding to a unicast PDSCH and the HARQ-ACK corresponding to the multicast PDSCH is indefinite. This collision may be at least one of case 1 to case 3 below.

Figure 5A:
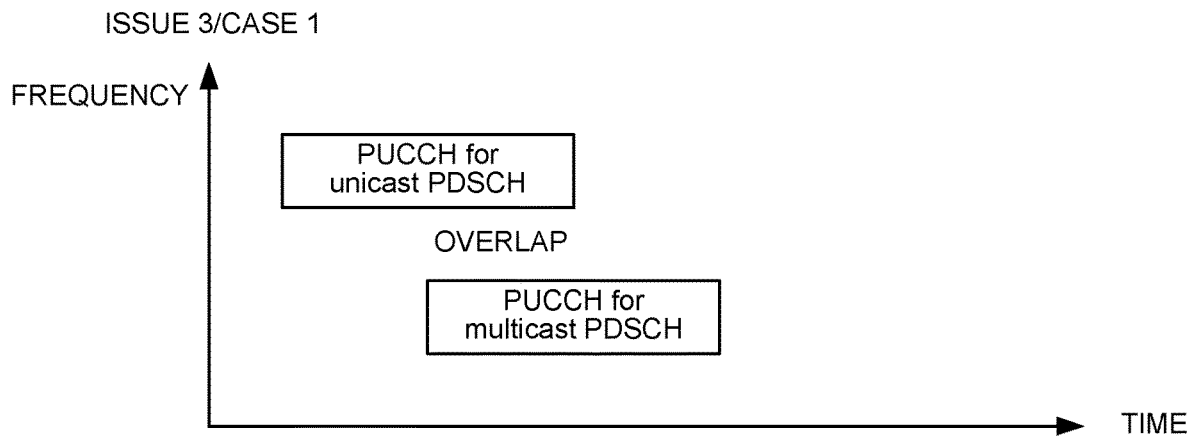
FIGS. 5A to 5C are each a diagram to show an example of collision between a PUCCH corresponding to a unicast PDSCH and a PUCCH corresponding to a multicast PDSCH according to a third embodiment.

[[Case 1]] PUCCH A including the HARQ-ACK corresponding to the unicast PDSCH and PUCCH B including the HARQ-ACK corresponding to the multicast PDSCH collide with each other (FIG. 5A).

Figure 5B:
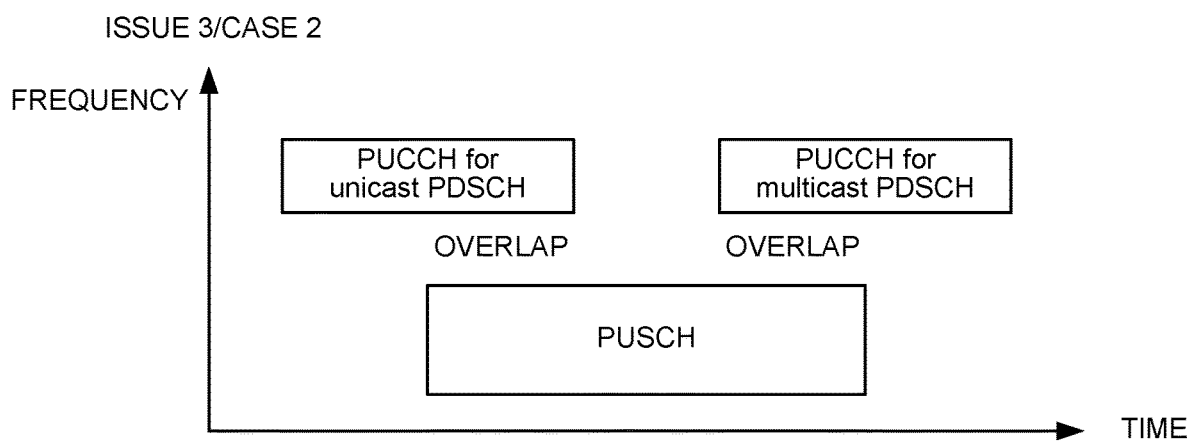

[[Case 2]] PUCCH A including the HARQ-ACK corresponding to the unicast PDSCH and a PUSCH collide with each other, and PUCCH B including the HARQ-ACK corresponding to the multicast PDSCH and the same PUSCH collide with each other. PUCCH A and PUCCH B do not collide with each other (FIG. 5B).

Figure 5C:
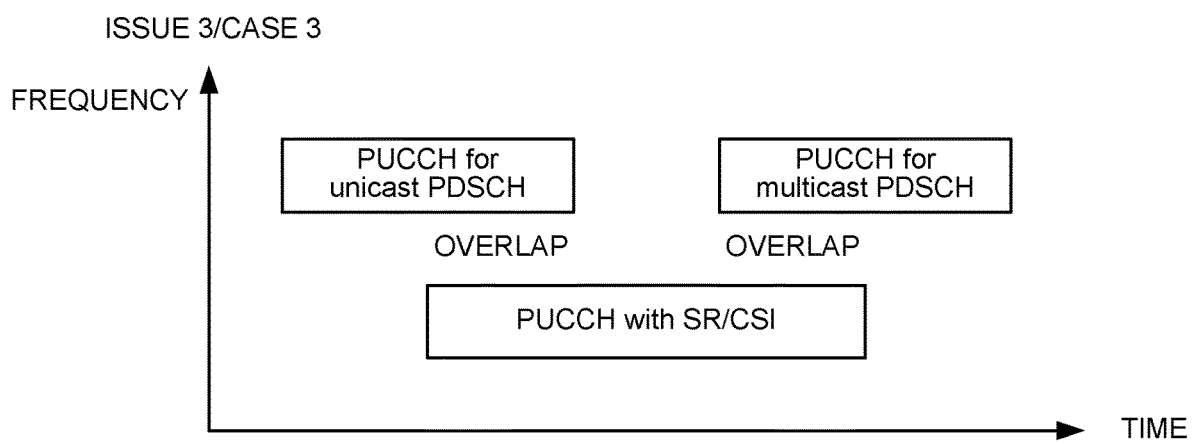

[[Case 3]] PUCCH A including the HARQ-ACK corresponding to the unicast PDSCH and PUCCH C collide with each other, and PUCCH B including the HARQ-ACK corresponding to the multicast PDSCH and PUCCH C collide with each other. PUCCH A and PUCCH B do not collide with each other (FIG. 5C).

Unless the UE operation in the case where the PUCCH including the HARQ-ACK corresponding to the multicast PDSCH collides with another UL channel in the time domain is definite, throughput reduction or the like may occur.

Thus, the inventors of the present invention came up with the idea of a method for resolving overlap (collision) between a multicast PDSCH and another UL channel.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, "support," "control," "controllable," "operate," and "operable" may be interchangeably interpreted.

In the present disclosure, configure, activate, update, indicate, enable, specify, and select may be interchangeably interpreted.

In the present disclosure, use, determine, apply, and select may be interchangeably interpreted.

In the present disclosure, link, associate, correspond, and map may be interchangeably interpreted. In the present disclosure, allocate, assign, monitor, and map may be interchangeably interpreted.

In the present disclosure, the higher layer signaling may be, for example, any one or combinations of Radio Resource Control (RRC) signaling, Medium Access Control (MAC) signaling, broadcast information, or the like. In the present disclosure, RRC, RRC signaling, an RRC parameter, a higher layer, a higher layer parameter, an RRC information element (IE), and an RRC message may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a MAC CE and an activation/deactivation command may be interchangeably interpreted.

In the present disclosure, a PUCCH, a PUSCH, repetition, and a transmission occasion may be interchangeably interpreted.

In the present disclosure, multicast, groupcast, broadcast, and an MBS may be interchangeably interpreted. In the present disclosure, a multicast PDSCH and a PDSCH scrambled by a group-common RNTI may be interchangeably interpreted.

In the present disclosure, HARQ-ACK, HARQ-ACK information, HARQ, ACK/NACK, ACK, NACK, and UCI may be interchangeably interpreted.

In the present disclosure, "specific," "dedicated," "UE-specific," and "UE-dedicated" may be interchangeably interpreted.

In the present disclosure, "common," "shared," "group-common," "UE-common," and "shared by UEs" may be interchangeably interpreted.

In the present disclosure, UE-dedicated DCI and DCI having a CEC scrambled by a UE-dedicated RNTI may be interchangeably interpreted. The UE-dedicated RNTI may be, for example, a C-RNTI.

In the present disclosure, UE-common DCI and DCI having a CEC scrambled by a UE-common RNTI may be interchangeably interpreted. The UE-common RNTI may be, for example, a multicast-RNTI.

In the present disclosure, a PDSCH cast type may indicate whether a PDSCH is unicast or multicast.

In the present disclosure, mapping HARQ-ACK information to a PUSCH, multiplexing HARQ-ACK information and data (UL-SCH) on a PUSCH, and transmitting HARQ-ACK information on a PUSCH may be interchangeably interpreted. In the present disclosure, mapping HARQ-ACK information to a PUCCH, multiplexing HARQ-ACK information and another UCI on a PUCCH, and transmitting HARQ-ACK information on a PUCCH may be interchangeably interpreted.

In the present disclosure, puncturing a PUSCH by using HARQ-ACK information, and overwriting HARQ-ACK information with a PUSCH after mapping data (uplink (UL)-shared channel (SCH)) to the PUSCH may be interchangeably interpreted.

Radio Communication Method

When a PUCCH for HARQ-ACK transmission corresponding to a multicast PDSCH and another UL channel overlap with each other in at least time domain, a UE performs overlap resolution based on a condition.

First Embodiment

Figure 3:
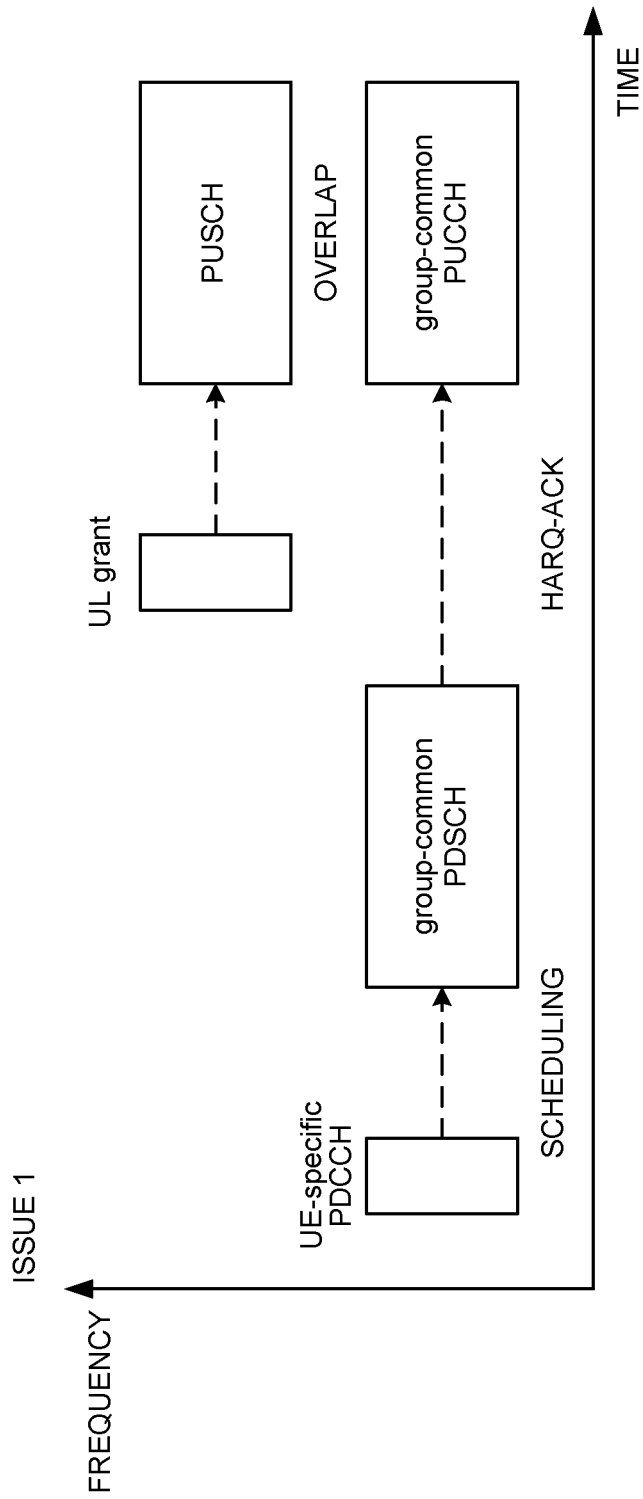
FIG. 3 is a diagram to show an example of collision between a PUCCH corresponding to a multicast PDSCH and a PUSCH according to a first embodiment.

In a certain UE in a case where for a PUCCH including an HARQ-ACK corresponding to a multicast PDSCH, a resource of the PUCCH is shared (common) between a plurality of UEs, in a case (FIG. 3, issue 1) where a PUSCH colliding with the PUCCH in a time domain is present, the UE may follow at least one of aspect 1-1 to aspect 1-8 below.

[Aspect 1-1]

The UE maps the HARQ-ACK to the PUSCH (multiplexes the HARQ-ACK and data (UL-SCH) in the PUSCH), and does not transmit the PUCCH.

[Aspect 1-2]

The UE does not map the HARQ-ACK to the PUSCH, and transmits the PUCCH. The UE may transmit the PUSCH, or may not transmit the PUSCH.

[Aspect 1-3]

The UE maps the HARQ-ACK to the PUSCH and transmits the PUCCH simultaneously.

[Aspect 1-4]

The UE does not map the HARQ-ACK to the PUSCH, and does not transmit the PUCCH. The UE may transmit the PUSCH, or may not transmit the PUSCH.

[Aspect 1-5]

The UE uses (determines/applies/selects) any one of aspect 1-1 to aspect 1-4 based on whether an HARQ-ACK transmission method is ACK/NACK feedback or NACK-only feedback.

[Aspect 1-6]

The UE uses (determines/applies/selects) any one of aspect 1-1 to aspect 1-4 based on the number of bits of the HARQ-ACK.

[Aspect 1-7]

The UE uses (determines/applies/selects) any one of aspect 1-1 to aspect 1-4 based on a PUCCH format of the PUCCH.

[Aspect 1-8]

The UE uses (determines/applies/selects) any one of aspect 1-1 to aspect 1-4 based on an RRC parameter/MAC CE/DCI format/DCI field/PDCCH (DCI CRC) scrambling RNTI/CORESET/search space/UE capability.

In a case where for the PUCCH including the HARQ-ACK corresponding to the multicast PDSCH, a resource of the PUCCH is UE-specific, operation in a case where a PUSCH colliding with the PUCCH in the time domain is present may be the same as operation (Rel. 15/16) in a case where a PUSCH colliding, in the time domain, with a PUCCH including an HARQ-ACK corresponding to a unicast PDSCH is present.

According to this embodiment, UE operation is clarified. When the HARQ-ACK is mapped to the PUSCH, the operation is operation common to the unicast PDSCH, and thus the UE operation can be simplified. When the HARQ-ACK is transmitted by using the PUCCH, a change of base station operation in a common PUCCH resource is unnecessary.

Second Embodiment

Figure 4:
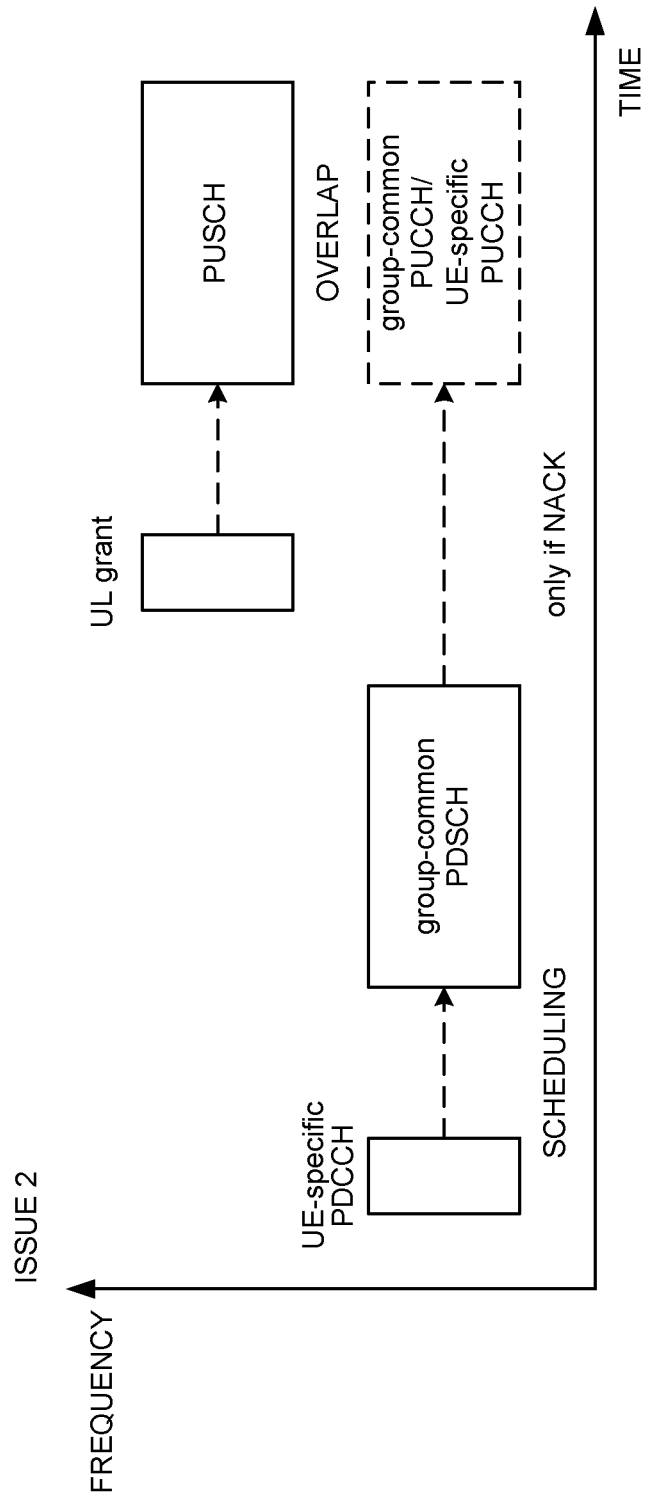
FIG. 4 is a diagram to show an example of collision between a PUCCH corresponding to a multicast PDSCH and a UL channel according to a second embodiment.

In a certain UE in a case where for a PUCCH including an HARQ-ACK corresponding to a multicast PDSCH, NACK-only feedback is configured/indicated, in a case (FIG. 4, issue 2) where a UL channel colliding with a resource of the PUCCH in a time domain is present, the UE may follow at least one of aspect 2a and aspect 2b below.

<<Aspect 2a>>

When the UL channel colliding, in the time domain, with the PUCCH including the HARQ-ACK corresponding to the multicast PDSCH is a PUSCH, the UE may follow at least one of aspect 2a-1 to aspect 2a-12 below.

[Aspect 2a-1]

The UE maps the HARQ-ACK to the PUSCH (multiplexes the HARQ-ACK and data (UL-SCH) in the PUSCH), and does not transmit the PUCCH.

[Aspect 2a-2]

The UE does not map the HARQ-ACK to the PUSCH, and transmits the PUCCH. The UE may transmit the PUSCH, or may not transmit the PUSCH.

[Aspect 2a-3]

The UE maps the HARQ-ACK to the PUSCH and transmits the PUCCH simultaneously.

[Aspect 2a-4]

The UE does not map the HARQ-ACK to the PUSCH, and does not transmit the PUCCH. The UE may transmit the PUSCH, or may not transmit the PUSCH.

[Aspect 2a-5]

The UE uses (determines/applies/selects) any one of aspect 2a-1 to aspect 2a-4 depending on whether the PDSCH is successfully received/decoded (whether a NACK is generated).

When the PDSCH is successfully received/decoded, the UE may use aspect 2a-4. When the PDSCH is failed to be received/decoded, the UE may use aspect 2a-1. In this case, the UE can perform NACK-only feedback on the PUSCH, and can always transmit the data.

When the PDSCH is successfully received/decoded, the UE may use aspect 2a-4. When the PDSCH is failed to be received/decoded, the UE may use aspect 2a-2. In this case, NACK-only feedback operation is not changed by the collision.

[Aspect 2a-6]

The UE uses (determines/applies/selects) any one of aspect 2a-1 to aspect 2a-3 based on the number of bits of the HARQ-ACK.

When the HARQ-ACK has up to 2 bits, the UE may use aspect 2a-1. When the HARQ-ACK has more than 2 bits, the UE may use aspect 2a-4 (may not map the HARQ-ACK to the PUSCH). Here, when the HARQ-ACK has up to 2 bits, puncturing the PUSCH to map the HARQ-ACK to the PUSCH allows a base station to recognize mapping of the UL-SCH without recognizing whether the HARQ-ACK is mapped.

[Aspect 2a-7]

The UE uses (determines/applies/selects) any one of aspect 2a-1 to aspect 2a-4 based on a PUCCH format of the PUCCH.

[Aspect 2a-8]

The UE uses (determines/applies/selects) any one of aspect 2a-1 to aspect 2a-4 based on an RRC parameter/MAC CE/DCI format/DCI field/PDCCH (DCI CRC) scrambling RNTI/CORESET/search space/UE capability.

[Aspect 2a-9]

When the HARQ-ACK is mapped to the PUSCH, a mapping (multiplexing) method is different from a method for mapping an HARQ-ACK for a unicast PDSCH to the PUSCH.

For example, the UE may puncture the PUSCH without depending on the number of HARQ-ACK bits (may overwrite the PUSCH with the HARQ-ACK after mapping the UL-SCH to the PUSCH). In this case, a position of the mapping of the UL-SCH is independent of whether the HARQ-ACK is mapped.

[Aspect 2a-10]

A UL DAI in a UL grant (DCI) scheduling the PUSCH may have a value with an assumption that the HARQ-ACK is mapped to the PUSCH. The UL DAI in the UL grant (DCI) scheduling the PUSCH may have a value with an assumption that the HARQ-ACK is not mapped to the PUSCH.

The UE may perform processing of HARQ-ACK based on the UL DAI. The UE may map the HARQ-ACK to the PUSCH based on the UL DAI in the UL grant (DCI) scheduling the PUSCH. The UE may not map the HARQ-ACK to the PUSCH based on the UL DAI in the UL grant (DCI) scheduling the PUSCH.

Note that a case may be defined in which the UE does not assume that DCI (DL assignment) scheduling a multicast PDSCH corresponding to an HARQ-ACK to be transmitted in a PUCCH overlapping with the PUSCH (in the time domain) is received after the UL grant. A case may be defined in which the UE does not assume that DCI to indicate an HARQ-ACK overlapping with the PUSCH (in the time domain) is received after the UL grant.

[Aspect 2a-11]

When the UE successfully receive/decode the PDSCH and transmits the HARQ-ACK (a transmission occasion for the HARQ-ACK is present), the UE may transmit an ACK. For example, when the UE has determined to transmit a PUSCH colliding with a PUCCH (for example, aspect 2a-1), the UE may map an ACK for the multicast PDSCH to the PUSCH.

[Aspect 2a-12]

When the UE successfully receive/decode the PDSCH and transmits the HARQ-ACK (a transmission occasion for the HARQ-ACK is present), the UE may transmit an ACK regardless of configuration/indication of the NACK-only feedback. For example, when the UE has determined to transmit a PUSCH colliding with a PUCCH (for example, aspect 2a-1), the UE may map an ACK for the multicast PDSCH to the PUSCH regardless of configuration/indication of the NACK-only feedback for the multicast PDSCH.

In aspect 2a, when the HARQ-ACK is mapped to the PUSCH, the operation is common to operation for the unicast PDSCH, and thus a UE structure can be simplified. In aspect 2a, when the HARQ-ACK has up to 2 bits, it is unnecessary to change base station operation even when NACK-only feedbacks from a plurality of UEs are multiplexed. In aspect 2a, when the HARQ-ACK is mapped to the PUCCH, it is unnecessary to change UE operation related to the NACK-only feedback.

<<Aspect 2b>>

When the UL channel colliding, in the time domain, with PUCCH X including the HARQ-ACK corresponding to the multicast PDSCH is PUCCH Y, the UE may follow at least one of aspect 2b-1 to aspect 2b-9 below. PUCCH Y may include at least one of a scheduling request (SR) and channel state information (CSI).

[Aspect 2b-1]

The UE multiplexes PUCCH X and PUCCH Y onto at least one PUCCH of PUCCH X, PUCCH Y, and another PUCCH Z. The UE may map UCI of PUCCH X (for example, the HARQ-ACK) and UCI of PUCCH Y (for example, the SR/CSI) to at least one of PUCCH X, PUCCH Y, and PUCCH Z. A PUCCH to map the UCI (HARQ-ACK), among PUCCH X, PUCCH Y, and PUCCH Z, may be defined in specifications, or may be a PUCCH associated with a higher priority. The UE may not transmit one or both of PUCCH X and PUCCH Y.

[Aspect 2b-2]

The UE transmits one of PUCCH X and PUCCH Y, and drops the other. Which of transmission of PUCCH X or transmission of PUCCH Y is prioritized may be defined in the specifications. Each of PUCCH X and PUCCH Y may be associated with a priority (DCI scheduling each of PUCCH X and PUCCH Y may include a priority (priority indicator field)). When a priority of PUCCH X and a priority of PUCCH Y are equal to each other, the UE may prioritize one defined in the specifications, between PUCCH X and PUCCH Y. When the priority of PUCCH X and the priority of PUCCH Y are different from each other, the UE may prioritize a PUCCH having a higher priority, between PUCCH X and PUCCH Y.

[Aspect 2b-3]

The UE does not multiplex PUCCH X and PUCCH Y (maps UCI for PUCCH X to PUCCH X and maps UCI for PUCCH Y to PUCCH Y), and transmits PUCCH X and PUCCH Y (simultaneously).

[Aspect 2b-4]

The UE uses (determines/applies/selects) any one of aspect 2b-1 to aspect 2b-3 depending on whether the PDSCH is successfully received/decoded (whether a NACK is generated).

[Aspect 2b-5]

The UE uses (determines/applies/selects) any one of aspect 2b-1 to aspect 2b-3 based on the number of bits of the HARQ-ACK or a total number of bits of the UCI for PUCCH X and the UCI for PUCCH Y.

[Aspect 2b-6]

The UE uses (determines/applies/selects) any one of aspect 2b-1 to aspect 2b-3 based on a PUCCH format of at least one of PUCCH X and PUCCH Y.

[Aspect 2b-7]

The UE uses (determines/applies/selects) any one of aspect 2b-1 to aspect 2b-3 based on an RRC parameter/MAC CE/DCI format/DCI field/PDCCH (DCI CRC) scrambling RNTI/CORESET/search space/UE capability.

[Aspect 2b-8]

When the UE successfully receive/decode the PDSCH and transmits the HARQ-ACK (a transmission occasion for the HARQ-ACK is present), the UE may transmit an ACK in at least one of PUCCH X, PUCCH Y, and another PUCCH Z. For example, when the UE has determined to transmit PUCCH Y colliding with PUCCH X, the UE may map an ACK for the multicast PDSCH to PUCCH Y.

[Aspect 2b-9]

When the UE successfully receive/decode the PDSCH and transmits the HARQ-ACK (a transmission occasion for the HARQ-ACK is present), the UE may transmit an ACK regardless of configuration/indication of the NACK-only feedback. For example, when the UE has determined to transmit PUCCH Y colliding with PUCCH X, the UE may map an ACK for the multicast PDSCH to PUCCH Y regardless of configuration/indication of the NACK-only feedback for the multicast PDSCH.

In aspect 2b, when the ACK is always transmitted in a case where the PDSCH is successfully decoded, it does not affect a UCI payload size and a PUCCH resource to be used.

In aspect 2b, transmitting only a NACK or dropping one of the PUCCHs can simplify the UE structure.

Third Embodiment

For collision between an HARQ-ACK corresponding to a unicast PDSCH and an HARQ-ACK corresponding to a multicast PDSCH, a UE may follow at least one of aspect 3a to aspect 3c below.

<<Aspect 3a>>

When PUCCH A including HARQ-ACK A corresponding to the unicast PDSCH and PUCCH B including HARQ-ACK B corresponding to the multicast PDSCH collide with each other in a time domain (FIG. 5A, case 1 of issue 3), the UE may follow at least one of aspect 3a-1 to aspect 3a-7 below.

[Aspect 3a-1]

The UE multiplexes HARQ-ACK A and HARQ-ACK B onto at least one PUCCH of PUCCH A, PUCCH B, and another PUCCH C. The UE may map HARQ-ACK A and HARQ-ACK B to at least one PUCCH of PUCCH A, PUCCH B, and PUCCH C, and may transmit at least one PUNCH of PUCCH A, PUCCH B, and PUCCH C. A PUCCH to map the HARQ-ACK, among PUCCH A, PUCCH B, and PUCCH C, may be defined in specifications, or may be a PUCCH associated with a higher priority. The UE may not transmit one or both of PUCCH A and PUCCH B.

[Aspect 3a-2]

The UE transmits one of PUCCH A and PUCCH B (HARQ-ACK A and HARQ-ACK B), and drops the other. Which of transmission of HARQ-ACK A or transmission of HARQ-ACK B is prioritized may be defined in the specifications. Each of HARQ-ACK A and HARQ-ACK B may have may be associated with a priority (DCI scheduling each of PUCCH A and PUCCH B may include a priority (priority indicator field)). When a priority of HARQ-ACK A and a priority of PUCCH B are equal to each other, the UE may prioritize one defined in the specifications, between HARQ-ACK A and HARQ-ACK B. When the priority of HARQ-ACK A and the priority of PUCCH B are different from each other, the UE may prioritize an HARQ-ACK having a higher priority, between HARQ-ACK A and HARQ-ACK B.
[Aspect 3a-3]
The UE does not multiplex HARQ-ACK A and HARQ-ACK B (maps HARQ-ACK A to PUCCH A and maps HARQ-ACK B to PUCCH B), and transmits PUCCH A and PUCCH B (simultaneously).
[Aspect 3a-4]
The UE uses (determines/applies/selects) any one of aspect 3a-1 to aspect 3a-3 based on the number of bits of each of HARQ-ACK A and HARQ-ACK B or a total number of bits of HARQ-ACK A and HARQ-ACK B (UCI for PUCCH A and PUCCH B).
[Aspect 3a-5]
The UE uses (determines/applies/selects) any one of aspect 3a-1 to aspect 3a-3 based on a PUCCH format of at least one of PUCCH A and PUCCH B.
[Aspect 3a-6]
The UE uses (determines/applies/selects) any one of aspect 3a-1 to aspect 3a-3 based on an RRC parameter/MAC CE/DCI format/DCI field/PDCCH (DCI CRC) scrambling RNTI/CORESET/search space/UE capability.
[Aspect 3a-7]
The UE uses (determines/applies/selects) any one of aspect 3a-1 to aspect 3a-3 based on an HARQ-ACK codebook type.

In aspect 3a, when HARQ-ACK A and HARQ-ACK B are multiplexed, communication quality can be maintained or improved. In aspect 3a, when any one of PUCCH A and PUCCH B is dropped, UE operation can be simplified.

<<Aspect 3b>>
When PUCCH A including the HARQ-ACK corresponding to the unicast PDSCH and a PUSCH collide with each other in the time domain, PUCCH B including the HARQ-ACK corresponding to the multicast PDSCH and the same PUSCH collide with each other in the time domain, and PUCCH A and PUCCH B do not collide with each other in the time domain (FIG. 5B, case 2 of issue 3), the UE may follow at least one of aspect 3b-1 to aspect 3b-9 below.
[Aspect 3b-1]
The UE multiplexes, in the PUSCH, HARQ-ACK A and HARQ-ACK B onto the PUSCH. The UE maps HARQ-ACK A and HARQ-ACK B to the PUSCH, and transmits the PUSCH. The UE may not transmit at least one of PUCCH A and PUCCH B.
[Aspect 3b-2]
The UE drops one of HARQ-ACK A and HARQ-ACK B, maps the other to the PUSCH, and transmits the PUSCH. Which of transmission of HARQ-ACK A or transmission of HARQ-ACK B is prioritized may be defined in the specifications. Each of HARQ-ACK A and HARQ-ACK B may be associated with a priority (DCI scheduling each of PUCCH A and PUCCH B may include a priority (priority indicator field)). When a priority of HARQ-ACK A and a priority of PUCCH B are equal to each other, the UE may prioritize one defined in the specifications, between HARQ-ACK A and HARQ-ACK B. When the priority of HARQ-ACK A and the priority of PUCCH B are different from each other, the UE may prioritize an HARQ-ACK having a higher priority, between HARQ-ACK A and HARQ-ACK B.
[Aspect 3b-3]
The UE does not multiplex HARQ-ACK A and HARQ-ACK B (maps HARQ-ACK A to PUCCH A and maps HARQ-ACK B to PUCCH B), and transmits PUCCH A, PUCCH B, and the PUSCH (simultaneously).
[Aspect 3b-4]
The UE does not multiplex HARQ-ACK A and HARQ-ACK B (maps HARQ-ACK A to PUCCH A and maps HARQ-ACK B to PUCCH B), transmits PUCCH A and PUCCH B, and drops the PUSCH.
[Aspect 3b-5]
The UE uses (determines/applies/selects) any one of aspect 3b-1 to aspect 3b-4 based on the number of bits of each of HARQ-ACK A and HARQ-ACK B or a total number of bits of HARQ-ACK A and HARQ-ACK B (UCI for PUCCH A and PUCCH B).
[Aspect 3b-6]
The UE uses (determines/applies/selects) any one of aspect 3b-1 to aspect 3b-4 based on a PUCCH format of at least one of PUCCH A and PUCCH B.
[Aspect 3b-7]
The UE uses (determines/applies/selects) any one of aspect 3b-1 to aspect 3b-4 based on an RRC parameter/MAC CE/DCI format/DCI field/PDCCH (DCI CRC) scrambling RNTI/CORESET/search space/UE capability.
[Aspect 3b-8]
The UE uses (determines/applies/selects) any one of aspect 3b-1 to aspect 3b-4 based on an HARQ-ACK codebook type.
[Aspect 3b-9]
A UL DAI in a UL grant (DCI) scheduling the PUSCH is a value corresponding to an HARQ-ACK to be transmitted. For example, in aspect 3b-1, the UL grant may include one (one set of) UL DAI determined based on both of HARQ-ACK A and HARQ-ACK B, or the UL grant may include two (two sets of) UL DAIs determined based on respective HARQ-ACK A and HARQ-ACK B. The UE may map the HARQ-ACK to the PUSCH based on the UL DAI.

In aspect 3b, when HARQ-ACK A and HARQ-ACK B are multiplexed, communication quality can be maintained or improved. In aspect 3b, when any one of PUCCH A, PUCCH B, and the PUSCH is dropped, UE operation can be simplified.

<<Aspect 3c>>
When PUCCH A including the HARQ-ACK corresponding to the unicast PDSCH and PUCCH C collide with each other in the time domain, PUCCH B including the HARQ-ACK corresponding to the multicast PDSCH and PUCCH C collide with each other in the time domain, and PUCCH A and PUCCH B do not collide with each other in the time domain (FIG. 5C, case 3 of issue 3), the UE may follow at least one of aspect 3c-1 to aspect 3c-8 below.
[Aspect 3c-1]
The UE multiplexes HARQ-ACK A, HARQ-ACK B, and UCI of PUCCH C, and transmits at least one PUCCH of PUCCH A, PUCCH B, PUCCH C, and another PUCCH D. The UE may map at least two of HARQ-ACK A, HARQ-ACK B, and the UCI of PUCCH C to at least one PUCCH of PUCCH A, PUCCH B, PUCCH C, and PUCCH D, and may transmit at least one PUCCH of PUCCH A, PUCCH B, PUCCH C, and PUCCH D. A PUCCH to map HARQ-ACK A, HARQ-ACK B, and the UCI of PUCCH C, among PUCCH A, PUCCH B, PUCCH C, and PUCCH D, may be defined in specifications, or may be a PUCCH associated with a higher priority. The UE may not transmit at least one of PUCCH A, PUCCH B, and PUCCH C.
[Aspect 3c-2]
The UE drops one of HARQ-ACK A and HARQ-ACK B, maps the other to PUCCH C or another PUCCH D, and transmits PUCCH C or PUCCH D. Which of transmission of HARQ-ACK A or transmission of HARQ-ACK B is prioritized may be defined in the specifications. Each of HARQ-ACK A and HARQ-ACK B may be associated with a priority (DCI scheduling each of PUCCH A and PUCCH B may include a priority (priority indicator field)). A priority of HARQ-ACK A and a priority of PUCCH B are equal to each other, the UE may prioritize one defined in the specifications, between HARQ-ACK A and HARQ-ACK B. The priority of HARQ-ACK A and the priority of PUCCH B are different from each other, the UE may prioritize an HARQ-ACK having a higher priority, between HARQ-ACK A and HARQ-ACK B.

[Aspect 3c-3]

The UE does not multiplex HARQ-ACK A and HARQ-ACK B (maps HARQ-ACK A to PUCCH A and maps HARQ-ACK B to PUCCH B), and transmits PUCCH A, PUCCH B, and PUCCH C (simultaneously).

[Aspect 3c-4]

The UE does not multiplex HARQ-ACK A and HARQ-ACK B (maps HARQ-ACK A to PUCCH A and maps HARQ-ACK B to PUCCH B), transmits PUCCH A and PUCCH B, and drops PUCCH C.

[Aspect 3c-5]

The UE uses (determines/applies/selects) any one of aspect 3c-1 to aspect 3c-4 based on the number of bits of each of HARQ-ACK A and HARQ-ACK B, a total number of bits of HARQ-ACK A and HARQ-ACK B (UCI for PUCCH A and PUCCH B), the number of bits of UCI for PUCCH C, or a total number of bits of HARQ-ACK A, HARQ-ACK B, and the UCI for PUCCH C (UCI for PUCCH A, PUCCH B, and PUCCH C).

[Aspect 3c-6]

The UE uses (determines/applies/selects) any one of aspect 3c-1 to aspect 3c-4 based on a PUCCH format of at least one of PUCCH A and PUCCH B.

[Aspect 3c-7]

The UE uses (determines/applies/selects) any one of aspect 3c-1 to aspect 3c-4 based on an RRC parameter/MAC CE/DCI format/DCI field/PDCCH (DCI CRC) scrambling RNTI/CORESET/search space/UE capability.

[Aspect 3c-8]

The UE uses (determines/applies/selects) any one of aspect 3c-1 to aspect 3c-4 based on an HARQ-ACK codebook type.

In aspect 3c, when HARQ-ACK A and HARQ-ACK B are multiplexed, communication quality can be maintained or improved. In aspect 3c, when any one of PUCCH A, PUCCH B, and PUCCH C is dropped, UE operation can be simplified.

Fourth Embodiment

A higher layer parameter (RRC information element)/UE capability corresponding to at least one function (characteristic, feature) in the first to third embodiments may be defined. The UE capability may indicate that the UE supports the function.

A UE for which the higher layer parameter corresponding to the function is configured may perform the function. It may be defined that a UE for which the higher layer parameter corresponding to the function is not configured does not perform the function.

A UE that reports the UE capability indicating that the UE supports the function may perform the function. It may be defined that a UE that does not report the UE capability indicating that the UE supports the function does not perform the function.

When a UE reports the UE capability indicating that the UE supports the function, and the higher layer parameter corresponding to the function is configured, the UE may perform the function. It may be defined that when a UE does not report the UE capability indicating that the UE supports the function or when the higher layer parameter corresponding to the function is not configured, the UE does not perform the function.

The function may be simultaneous transmission of a PUCCH and a PUSCH. The function may be simultaneous transmission of a PUCCH and a PUCCH.

When an identical beam/QCL/TCI state/spatial relation is configured/notified/indicated for a plurality of (for example, two) channels to be simultaneously transmitted (QCL relation for beam/QCL/TCI state/spatial relation for the plurality of channels to be simultaneously transmitted are the same, or QCL reference source RSs for beam/QCL/TCI state/ spatial relation for the plurality of channels to be simultaneously transmitted are common), the UE may perform the function (the simultaneous transmission). According to this condition, it is unnecessary for the UE to perform transmission by simultaneously using a plurality of different beams. This condition may be limited to a frequency (for example, frequency range (FR) 2/FR4) being a specific frequency or more. In a frequency (for example, FR1) lower than the specific frequency, this condition may be absent. The specific frequency may be any one of 7.152 GHZ, 24.25 GHZ, and 52.6 GHZ.

When an identical beam/QCL/TCI state/spatial relation is not configured/notified/indicated for a plurality of (for example, two) channels to be simultaneously transmitted, the UE may perform the function (the simultaneous transmission). This operation is suitable for a case where the UE can transmit one channel for each beam (a case where the UE has a multi-panel structure).

In the present embodiment, when a PUSCH can be skipped, for example, when data to be transmitted is absent, the PUSCH may not be skipped, and an HARQ-ACK corresponding to a multicast PDSCH may be transmitted after being mapped (multiplexed) to the PUSCH. This operation may be applied regardless of configuration/indication of NACK-only feedback for the multicast PDSCH.

According to this embodiment, the UE can achieve the above-described function while maintaining compatibility with existing specifications.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 6:
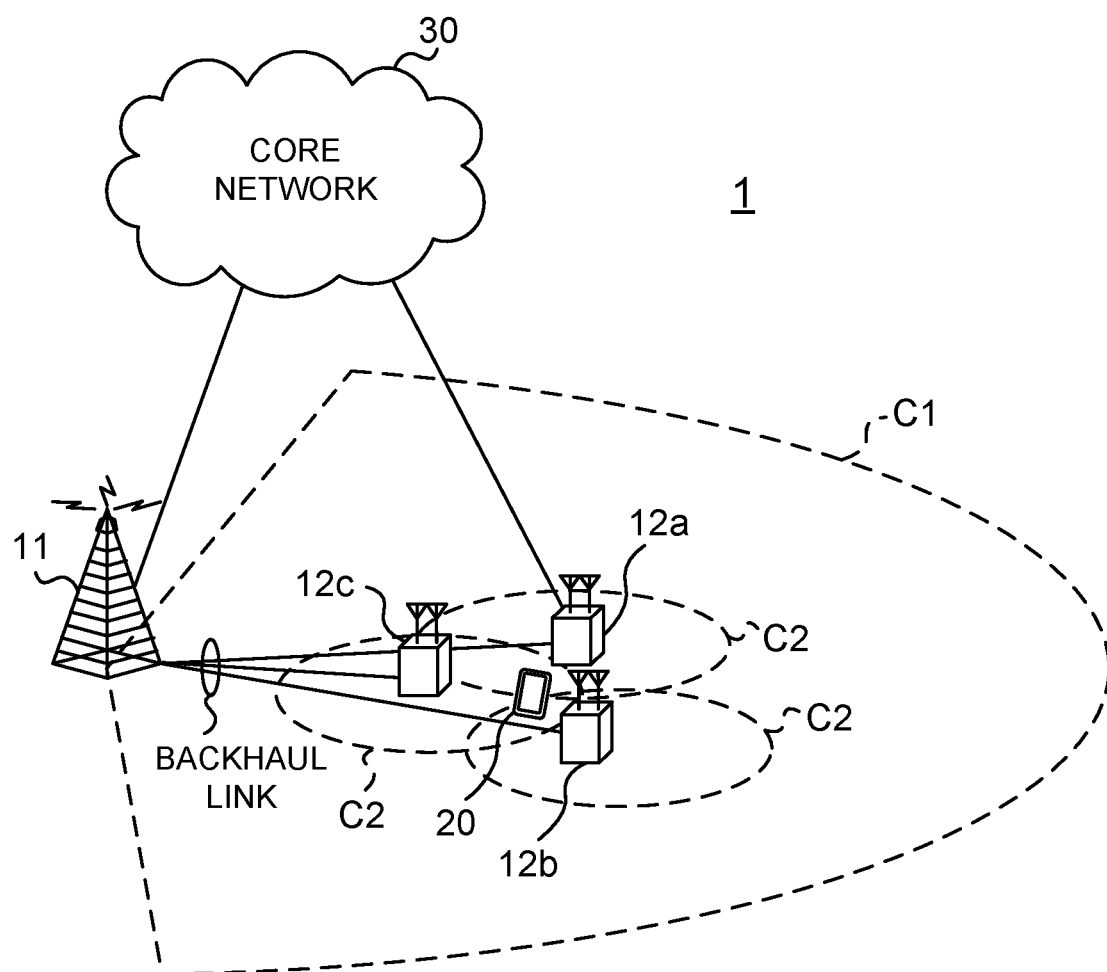
FIG. 6 is a diagram to show an example of a schematic structure of a radio communication system according to one embodiment.

FIG. 6 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, or the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are transmitted on the PDSCH. User data, higher layer control information and so on may be transmitted on the PUSCH. The Master Information Blocks (MIBs) may be transmitted on the PBCH.

Lower layer control information may be transmitted on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be transmitted by means of the PUCCH. By means of the PRACH, random access preambles for establishing connections with cells may be transmitted.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be transmitted. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be transmitted as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be transmitted as an uplink reference signal (UL-RS). Note that DMRS may be referred to as a "user terminal specific reference signal (UE-specific Reference Signal)."

Base Station

Figure 7:
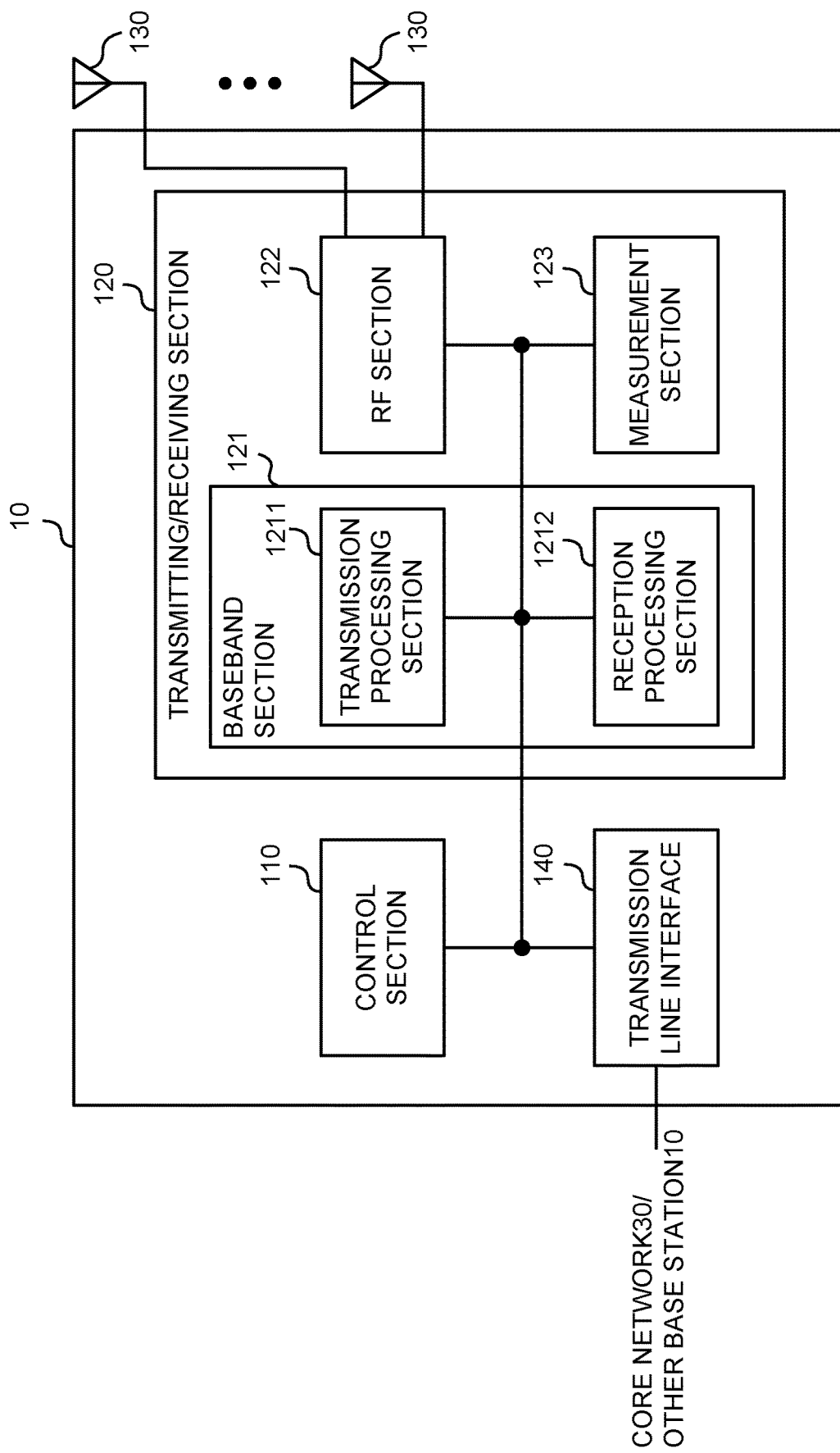
FIG. 7 is a diagram to show an example of a structure of a base station according to one embodiment.

FIG. 7 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

When a physical uplink control channel (PUCCH) for transmission of hybrid automatic repeat reQuest acknowledgement (HARQ-ACK) information for a multicast physical downlink shared channel (PDSCH) overlaps with an uplink channel in a time domain, the control section 110 may determine at least one channel of the PUCCH and the uplink channel. The transmitting/receiving section 120 may receive the channel.

User Terminal

Figure 8:
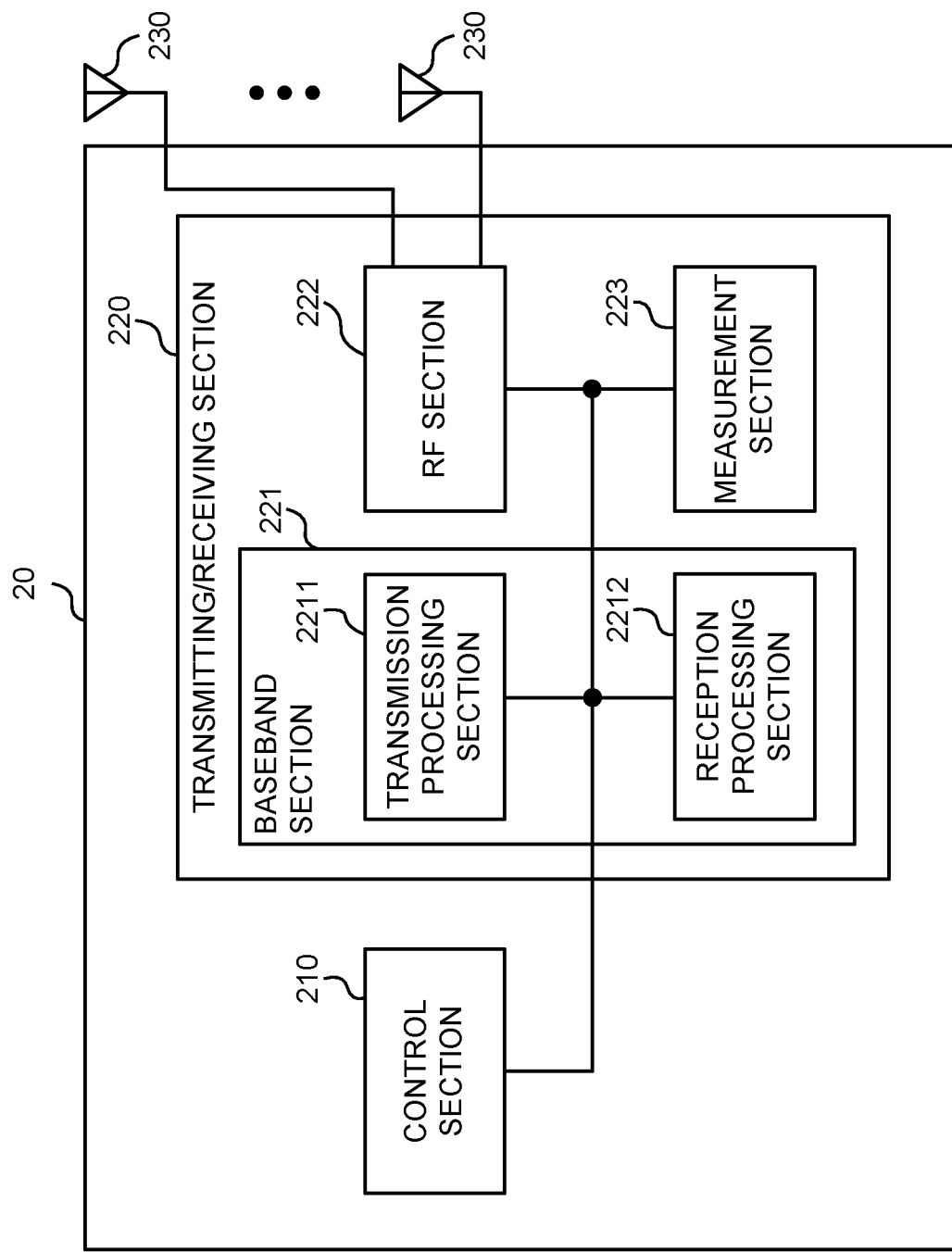
FIG. 8 is a diagram to show an example of a structure of a user terminal according to one embodiment.

FIG. 8 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

When a physical uplink control channel (PUCCH) for transmission of hybrid automatic repeat reQuest acknowledgement (HARQ-ACK) information for a multicast physical downlink shared channel (PDSCH) overlaps with an uplink channel in a time domain, the control section 210 may determine at least one channel of the PUCCH and the uplink channel. The transmitting/receiving section 220 may transmit the channel.

A resource of the PUCCH may be shared between a plurality of terminals (first embodiment).

A method for transmitting only a negative acknowledgement (NACK) may be applied to the PUCCH (second embodiment).

The uplink channel may be any one of a second PUCCH for transmission of second HARQ-ACK information for a unicast PDSCH and a channel overlapping with the second PUCCH in the time domain (third embodiment).

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, or the like, but function are by no means limited to these. For example, functional block (components) to implement a function of transmission may be referred to as a "transmitting section (transmitting unit)," a "transmitter," or the like. The method for implementing each component is not particularly limited as described above.

Figure 9:
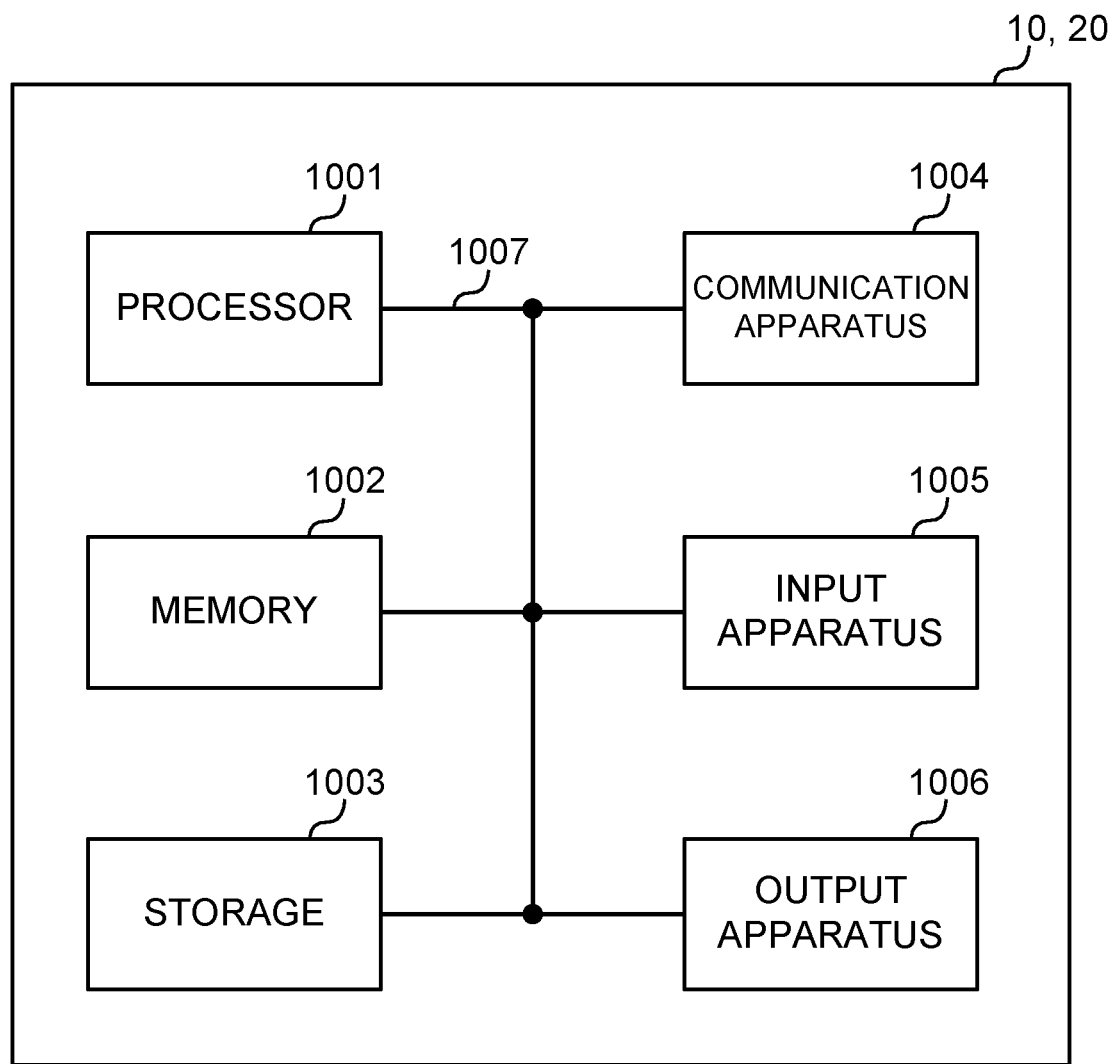
FIG. 9 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 9 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, or the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a givensignal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmission power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB,"

an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, or the like), may be a moving object which moves unmanned (for example, a drone, an automatic operation car, or the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, or the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," or the like). In this case, user terminals 20 may have the functions of the base stations 10 described above. The words "uplink," "downlink," or the like may be interpreted as the words corresponding to the terminal-to-terminal communication (for example, "sidelink"). For example, an uplink channel, a downlink channel, or the like may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, or the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," or the like.

"The maximum transmission power" according to the present disclosure may mean a maximum value of the transmission power, may mean the nominal maximum transmission power (the nominal UE maximum transmission power), or may mean the rated maximum transmission power (the rated UE maximum transmission power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
   a receiver that receives a higher layer parameter for configuring to perform feedback of hybrid automatic repeat request acknowledgement (HARQ-ACK) including only a negative acknowledgement (NACK) for the HARQ-ACK corresponding to a multicast physical downlink shared channel (PDSCH); and
   a processor that controls, when a first physical uplink control channel (PUCCH) for a transmission of the HARQ-ACK in a case where the feedback of the HARQ-ACK including only the NACK is configured is overlapped with a second PUCCH or a physical uplink shared channel (PUSCH) in a time domain, a transmission of the HARQ-ACK multiplexed on the second PUCCH or the PUSCH,
   wherein when the first PUCCH is overlapped with the second PUCCH or the PUSCH, the processor multiplexes, on the second PUCCH or the PUSCH, an ACK for the PDSCH that is correctly decoded, according to a configuration of a feedback of the HARQ-ACK including an ACK instead of the configuration of the feedback of the HARQ-ACK including only the NACK, and
   wherein when the second PUCCH is a PUCCH transmitting a HARQ-ACK corresponding to a unicast-PDSCH, the processor controls a transmission of the HARQ-ACK corresponding to the multicast PDSCH and the HARQ-ACK corresponding to the unicast PDSCH that are multiplexed on the second PUCCH.

2. The terminal according to claim 1, wherein the second PUCCH is a PUCCH including channel state information (CSI).

3. A radio communication method for a terminal, comprising:
   receiving a higher layer parameter for configuring to perform feedback of hybrid automatic repeat request acknowledgement (HARQ-ACK) including only a negative acknowledgement (NACK) for the HARQ-ACK corresponding to a multicast physical downlink shared channel (PDSCH); and
   controlling, when a first physical uplink control channel (PUCCH) for a transmission of the HARQ-ACK in a case where the feedback of the HARQ-ACK including only the NACK is configured is overlapped with a second PUCCH or a physical uplink shared channel (PUSCH) in a time domain, a transmission of the HARQ-ACK multiplexed on the second PUCCH or the PUSCH,
   wherein when the first PUCCH is overlapped with the second PUCCH or the PUSCH, multiplexing, on the second PUCCH or the PUSCH, an ACK for the PDSCH that is correctly decoded, according to a configuration of a feedback of the HARQ-ACK including an ACK instead of the configuration of the feedback of the HARQ-ACK including only the NACK, and
   wherein when the second PUCCH is a PUCCH transmitting a HARQ-ACK corresponding to a unicast-PDSCH, controlling a transmission of the HARQ-ACK corresponding to the multicast PDSCH and the HARQ-ACK corresponding to the unicast PDSCH that are multiplexed on the second PUCCH.

4. A base station comprising:
   a transmitter that transmits a higher layer parameter for configuring to perform feedback of hybrid automatic repeat request acknowledgement (HARQ-ACK) including only a negative acknowledgement (NACK) for the HARQ-ACK corresponding to a multicast physical downlink shared channel (PDSCH); and
   a processor that controls, when a first physical uplink control channel (PUCCH) for a transmission of the HARQ-ACK in a case where the feedback of the HARQ-ACK including only the NACK is configured is overlapped with a second PUCCH or a physical uplink shared channel (PUSCH) in a time domain, a reception of the HARQ-ACK multiplexed and transmitted on the second PUCCH or the PUSCH,
   wherein when the first PUCCH is overlapped with the second PUCCH or the PUSCH, an ACK for the PDSCH that is correctly decoded is transmitted multiplexed on the second PUCCH or the PUSCH, according to a configuration of a feedback of the HARQ-ACK including an ACK instead of the configuration of the feedback of the HARQ-ACK including only the NACK, and wherein when the second PUCCH is a PUCCH transmitting a HARQ-ACK corresponding to a unicast-PDSCH, the processor controls the reception of the HARQ-ACK corresponding to the multicast PDSCH and the HARQ-ACK corresponding to the unicast PDSCH that are multiplexed on the second PUCCH.

5. A system comprising a terminal and a base station,
the terminal comprising:
  a receiver that receives a higher layer parameter for configuring to perform feedback of hybrid automatic repeat request acknowledgement (HARQ-ACK) including only a negative acknowledgement (NACK) for the HARQ-ACK corresponding to a multicast physical downlink shared channel (PDSCH); and
  a processor that controls, when a first physical uplink control channel (PUCCH) for a transmission of the HARQ-ACK in a case where the feedback of the HARQ-ACK including only the NACK is configured is overlapped with a second PUCCH or a physical uplink shared channel (PUSCH) in a time domain, a transmission of the HARQ-ACK multiplexed on the second PUCCH or the PUSCH, wherein when the first PUCCH is overlapped with the second PUCCH or the PUSCH, the processor multiplexes, on the second PUCCH or the PUSCH, an ACK for the PDSCH that is correctly decoded, according to a configuration of a feedback of the HARQ-ACK including an ACK instead of the configuration of the feedback of the HARQ-ACK including only the NACK, and wherein when the second PUCCH is a PUCCH transmitting a HARQ-ACK corresponding to a unicast-PDSCH, the processor controls a transmission of the HARQ-ACK corresponding to the multicast PDSCH and the HARQ-ACK corresponding to the unicast PDSCH that are multiplexed on the second PUCCH, and the base station comprising:
  a transmitter that transmits the configuration of the feedback of the HARQ-ACK including only the NACK; and
  a processor that controls a reception of the HARQ-ACK.

* * * * *